Figure 1:
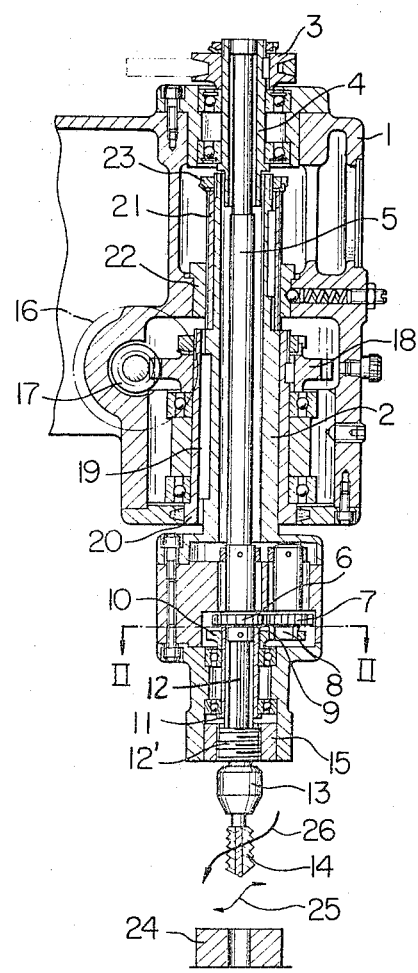

Feb. 14, 1967   JUNICHIRO KUMABE ETAL   3,303,522
VIBRATING TAPPING MACHINE
Filed April 3, 1964

INVENTORS
JUNICHIRO KUMABE and
KENZI NAKATA.
BY
Otto John Munz
ATTORNEY.

3,303,522
VIBRATING TAPPING MACHINE
Junichiro Kumabe and Kenzi Nakata, Tokyo, Japan, assignors to Niigata Engineering Co., Ltd., Tokyo, Japan
Filed Apr. 3, 1964, Ser. No. 357,156
Claims priority, application Japan, Apr. 13, 1963,
38/17,951
7 Claims. (Cl. 10—129)

The present invention relates to a vibrating tapping machine and more particularly to a tapping machine employing a cutting tool reciprocally vibrated substantially in the cutting direction during the machining of a material to be tapped.

Ideal machining results are obtained when material is machined with the cutting tool of the present invention. The machined surfaces have excellent wear resistance and anti-corrosion properties, and are free from burrs and surface roughness. A uniform product having an accurate machine finish is obtained. According to the present invention, the following relation is required:

$$v < 2\pi af$$

where
$v$—cutting speed
$f$—frequency
$a$—amplitude

The chips are constantly removed from the cutting tool rake for each cycle of vibration. The shearing deformation is produced on the shearing face in the short cutting time 1/10 to 1/20 of tool vibration period $T = 1/f$. Results, different from the conventional cutting practice are obtained in that a microscopic crack is produced in the shearing face close to tool rake surface by the concentrated stress presented at cutting tool tip area during the continuous cyclic and short cutting period, and cutting resistance is reduced by obtaining smooth shearing deformation of shear face. Accordingly, the coefficient of friction at tool rake surface is reduced, the temperature rise of the tool is minimized, and cutting of built-up edges (a characteristic of conventional cutting machines) is avoided. Additionally, since a clearance is cyclically produced between chips and tool rake surface, the cutting oil has a better flow in lubricating the tool tip when cutting lubricant is used.

Therefore, an object of the invention is to provide a tapping machine which employs vibrating cutting in tapping operation. The tap is vibrated in the direction of the tap lead angle which will be referred to as the cutting direction; and internal threading of the work placed on the table of the tapping machine is accomplished by revolving the machine spindle. According to this invention, the internal threat is machined free from deviation from the tap dimensions, and a high dimensional accuracy of the effective diameter of the internal thread is achieved, which accuracy can not be obtained with conventional tapping machines. The cutting speed of the cutting tool must be established in accordance with the requirement above described.

The high speed range of tapping work operation is limited to approximately 30 meters per minute. However, since the normal cutting speed is about 10 meters per minute or less, satisfactory vibration cutting can be obtained in employing the frequency of about 200 cycles/second. Thus in accordance with the invention a vibratory movement is superimposed on the cutting tool while the tool is moved in the usual manner. The vibratory movement is of a preselected amplitude and of a frequency greater than the rotation of the tool. For example, a normal cutting speed is about 10 meters per minute and satisfactory vibration cutting can be obtained using a superimposed frequency of about 200 cycles per second.

Figure 2:
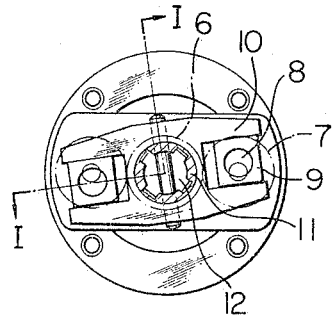

For a more complete understanding of the present invention, reference is made to the following description in connection with the accompanying drawings, in which:

FIG. 1 is a vertical sectional view of the main driving part of the tapping machine in accordance with the invention taken along line I—I of FIG. 2; and FIG. 2 is an enlarged horizontal cross-sectional view along line II—II of FIG. 1, showing in detail the mechanism effecting the oscillation of the tool.

The details of this invention are explained in referring to FIGS. 1 and 2. A pulley 3 located on the top of the frame 1 is rotated by a V-belt connected with a motor. The spline shaft 5, which is placed inside the main shaft 2, rotates in interlocking engagement with shaft 4. The end of shaft 5 is provided with gear 6 meshing with gears 7. When an eccentric pin 8 is rotated, the collar 9 moves in sliding engagement on the cam surface of the oscillation plate 10. The angle of oscillation of oscillating plate 10 is twice the eccentricity of eccentric pin 8. Moreover, the oscillating plate is fixed on the shaft 11. The main shaft 12 having tap holder 13 and tap 14 is interlocked with shaft 11 by a spline. The main shaft 12 is provided with external thread cam 12' having the same pitch as the tap, and they are firmly connected. An internally threaded cam 15 is mounted on the main shaft frame 2. Consequently, when the oscillating plate 10 is vibrating, the shaft 12 vibrates in the direction of tap lead angle 25 being guided by screwed cam as shown by the arrow in the drawing.

Thus, the following method is performed in cutting and feeding motion of the vibration tap. The pulley 16, which is rotated by a motor driven V-belt, rotates the worm wheel 17 positioned concentrically with it. Worm wheel 18 is mounted on the revolving cylinder 20 which is connected with main shaft 2 by key 19. The external lead screw 21 having the same pitch as tap 14 is tightened on the main shaft 2 by nut 23, and the internal lead nut 22 is fixed on the frame 1. The work 24 is fixed on the tapping machine table in the position shown in FIG. 1 to be threaded by the vibrating tap of this invention. On rotating the worm wheel, the tap is driven forward or backward according to the lead screw.

When the pulleys 3 and 16 of the above explained mechanism are rotated at the same time, the tap mounted on the end of main shaft performs a cutting and feed motion in the direction shown by arrow 26 by vibrating in the lead angle direction, that is, the cutting direction. The vibrating tap can be operated on the work 24 fixed on the tapping machine table. The cutting resistance produced by the invented vibration tapping machine can be reduced to about $1/5$ to $1/10$ of the conventional tapping machine. The uniform internal thread caan be formed free from any burr, correct and accurate to within about ±5 microns. Furthermore, there is no limitation on materials to be used in performing this tapping machine operation. A conventional tap may be used as it is. An improved machinability can be accomplished by this invented tapping machine. When the apparatus of this invention is used for internal roll threading with a fluteless tap, the roll resistance encountered is only about $1/10$ of that observed with conventional tap machines. Successful results are achieved in obtaining simple rolling and uniform work hardening of high carbon steel. With the tapping machine of this invention, remarkable improvements in the ability to machine and work taps as compared with conventional machines are obtained.

While we have disclosed the form of mechanism presently prefered by us for carrying the invention into practice, numerous modifications, alterations and substitutions of equivalents will occur to those skilled in the art, after a study of the foregoing specification. Hence the disclosure should be taken in an illustrative rather than a limiting sense; and it is our desire and intention to reserve all modifications and substitutions of equivalents within the scope of the subjoined claims.

What is claimed is:

1. A thread cutting machine comprising a thread cutting member, means for rotating and feeding said member at a preselected speed in the thread cutting direction, and means for superimposing a vibratory feeding and rotating motion of preselected amplitude and frequency on said first-mentioned rotating and feeding speed in the thread cutting direction.

2. A device as defined in claim 1, wherein the means for rotating the cutting member comprises a support for said cutting member and means for rotating the support.

3. A device as defined in claim 2, wherein the means for superimposing the vibratory feeding and rotating speed comprises a threaded cam of the same pitch as the cutting member mounted on the support, a cooperating cam in threaded engagement with the first-mentioned cam connected to the thread cutting member, and means for oscillating the cooperating cam at a preselected number of oscillations per single rotation of the cutting member.

4. A device as in claim 3, wherein the means for oscillating the cam comprises a shaft, a plate secured to the shaft, and drive means connected to the plate.

5. A device as defined in claim 4, wherein the drive means comprises a central gear, a pair of gears in meshing engagement with the central gear and rotatably mounted in the support, a pin secured to each of said meshing gears and mounted eccentrically to the axis of rotation thereof, and means connecting said pins to the plate.

6. The device as in claim 3 wherein the cutting member is a tap and the threads of the cams are of the same pitch as that of the tap.

7. A vibratory tapping machine comprising, a motor, a high speed rotary shaft driven by said motor, a cutting tool support shaft, an oscillation drive mechanism including a link device and cam means, said oscillation drive mechanism connecting said support shaft with said high speed rotary shaft to oscillate said cutting tool support shaft in the direction of the cut of the thread, and independent driving and control means for driving said cutting tool support shaft at a preselected thread cutting speed lower than a predetermined maximum thread cutting speed due to the vibration of said tool support shaft.

References Cited by the Examiner

UNITED STATES PATENTS 1,404,371  1/1922  Campbell _____ 10–129

FOREIGN PATENTS 544,611  4/1942  Great Britain.

ANDREW R. JUHASZ, *Primary Examiner.*